UNITED STATES PATENT OFFICE.

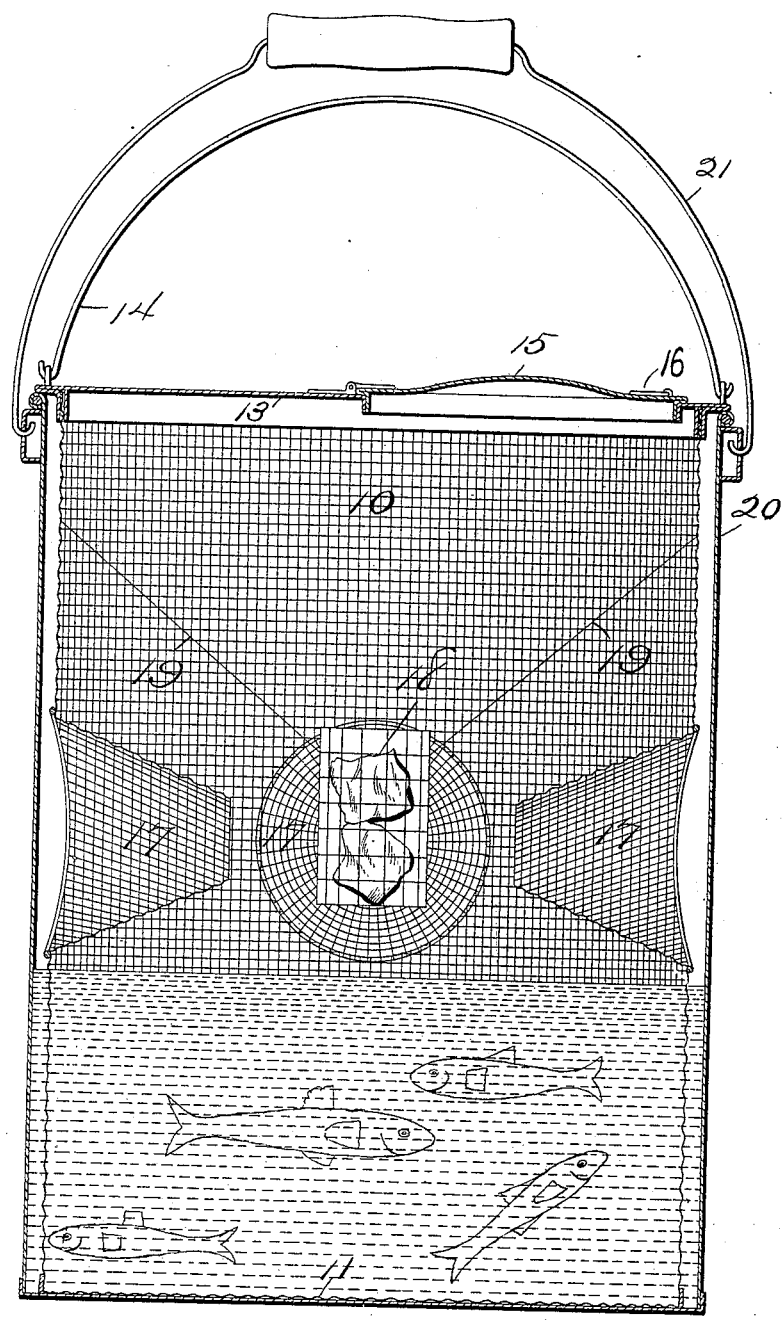

SQUIRE HEBERLING, OF DES MOINES, IOWA, ASSIGNOR OF ONE-HALF TO HENRY W. PARKER, OF SAME PLACE.

COMBINED MINNOW BUCKET AND TRAP.

SPECIFICATION forming part of Letters Patent No. 616,924, dated January 3, 1899.

Application filed December 27, 1897. Serial No. 663,809. (No model.)

*To all whom it may concern:*

Be it known that I, SQUIRE HEBERLING, a citizen of the United States, residing at Des Moines, in the county of Polk and State of Iowa, have invented a new and useful Minnow Bucket and Trap Combined, of which the following is a specification.

The object of this invention is to provide an improved minnow trap and bucket combined which shall be of simple, strong, durable, and inexpensive construction.

My object is more specifically to provide a device of this class in which the trap may be detached from the bucket and set in the water, and when a number of minnows have gathered therein the trap may be removed and placed in the bucket, which may be filled with water. Hence the minnows may be caught and placed in a bucket where they may be kept alive and transported without the necessity of handling the minnows or pouring them from one vessel to another.

My object is, further, to provide a device of this class in which any one of the minnows within the trap may be easily and quickly caught without the necessity of pouring the water from the pail, and when the minnow has been caught the remainder of them may be placed in the same water.

My invention consists, essentially, in the construction of the trap whereby it is adapted for the objects contemplated and the combination of the same with the bucket, as hereinafter more fully set forth, pointed out in my claims, and illustrated in the accompanying drawing, in which a vertical central sectional view of the entire device is shown with the trap in position within the bucket.

Referring to the accompanying drawing, the trap proper is seen to be composed of a cylinder (indicated by the reference-numeral 10,) having the flat bottom 11 therein, both made of wire-netting having a mesh so small that a minnow cannot pass through. At the top of the trap is a metal rim 13, and to this rim a bail 14 is pivoted.

15 indicates a sheet metal lid or cover hinged to the rim 13, and 16 indicates a clasp whereby the lid is securely held to the rim.

At a point near the central portion of the cylinder 10 I have provided a series of truncated cones 17, made of wire-netting, with their large outer ends secured to the cylinder.

The reference-numeral 18 is used to indicate a cage made of wire and designed to contain a quantity of bait. This cage is preferably supported by wires 19 in a position adjacent to the smaller ends of the cones 17.

The reference-numeral 20 indicates a minnow-bucket preferably cylindrical in shape and of a size to admit the cylinder 10 and provided with a bail 21.

In practical use and assuming that it is desired to catch a number of minnows the trap is detached from the bucket and placed in a vertical position, so as to rest upon the ground in shallow water, where the minnows that are attracted by the bait will pass through the truncated cones to the interior of the cylinder 10 and then will be unable to find the opening in the small end of the cone through which they enter, and consequently they will remain within the trap. When the desired number of minnows have been caught and assuming that it was desired to transport them and keep them alive, the bucket is filled with water and the trap placed within the bucket. It is obvious that should it be desired to catch one of the minnows this may be easily and quickly done by merely elevating the trap out of the bucket, whereupon all of the minnows within the trap will be found upon the bottom 11 of the cylinder. Then the desired one may be easily selected and the trap again placed within the bucket. By this means no water is lost from the bucket, and yet the minnows are readily accessible.

I am aware that heretofore fish and minnow traps have been made in which a vessel has a funnel-shaped opening to enter an enlarged chamber, at the small end of the funnel-shaped opening, and I do not desire to be understood as broadly claiming this idea; but I am not aware that there has ever been made a cylinder constructed of wire-netting having a lid and a bail on its top, a suspended cage for retaining bait, and a series of truncated cones in its sides to project inwardly toward the cage and bait, so that the trap may, after the minnows have entered it, be placed within a bucketful of water, and may then be easily transported and the trap itself serve as a means whereby the minnows therein may be drawn out of the water, so that any one thereof may be accurately selected and easily caught and then the remainder placed in the water within the bucket.

Having thus described the combined trap and bucket, what I claim as my invention, and desire to secure by Letters Patent of the United States therefor, is—

1. A combined minnow trap and bucket, comprising a trap approximately cylindrical in shape and made of wire-netting, a hinged cover at its top, a bail or handle fixed to its top, a series of truncated cones in the sides of the cylinder to project inwardly and with their outer ends opening outwardly, a device for supporting bait within the trap, a water-tight bucket designed to receive the trap, and a bail or handle fixed thereto whereby the bucket and trap may be carried, substantially as and for the purposes stated.

2. In a minnow-trap a cylindrical reticulated flat-bottomed vessel having an opening at its top to admit a person's hand, a series of open-ended truncated cones fixed to the central portion of the cylinder and their small ends converging toward the center of the cylinder and a bait-receptacle suspended between the inner ends of said plurality of cones, arranged and combined as and for the purposes stated.

SQUIRE HEBERLING.

Witnesses:
J. RALPH ORWIG,
THOMAS G. ORWIG.